April 14, 1959     L. NEWCOMB     2,882,098
DRAWWORKS BRAKE SYSTEM
Filed May 1, 1953
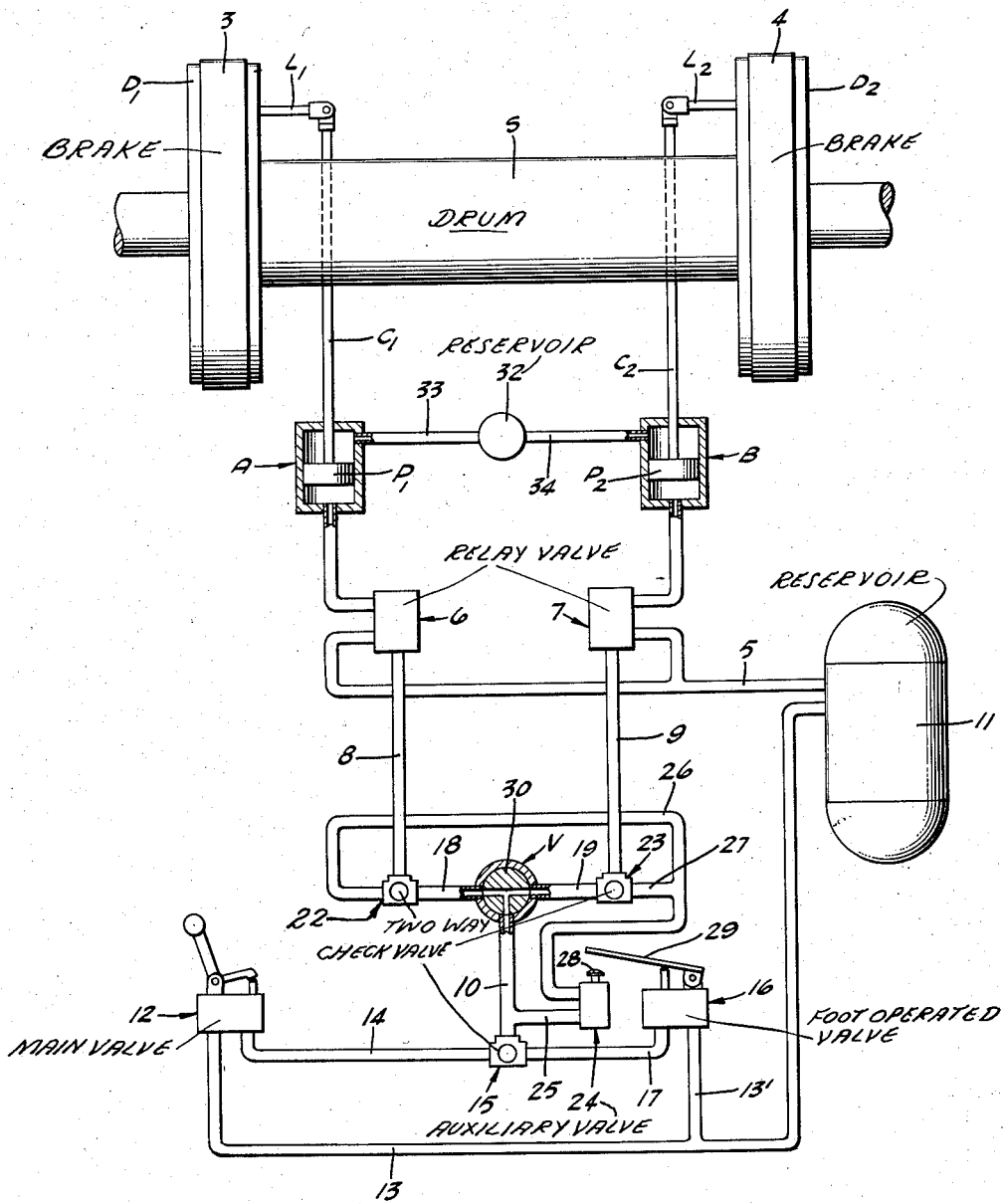
LEROY NEWCOMB
INVENTOR.
BY
ATTORNEY

United States Patent Office 2,882,098
Patented Apr. 14, 1959

2,882,098

DRAWWORKS BRAKE SYSTEM

Leroy Newcomb, Los Angeles, Calif., assignor, by mesne assignments, to The Youngstown Sheet and Tube Company Application May 1, 1953, Serial No. 352,457

4 Claims. (Cl. 303—6)

My invention relates in general to friction brakes for controlling rotation of a part and relates in particular to a system, especially suited for air pressure operation, for actuating the brakes associated with the cable spooling drum of drawworks employed for well drilling.

It is an object of the invention to provide a system especially adapted for the operation of the two brakes of a drawworks cable drum having simple means whereby the driller may selectively use either of the brakes separately or both brakes simultaneously. This enables the driller to obtain braking action or effects suitable to the cable operations being carried on at the instant time.

In the operation of well drilling drawworks it is desirable to employ both brake bands when heavy loads are being handled or during the operation of running pipe in or out of a deep well. However, at shallow depths it is advantageous to employ only one brake band. During the operation of "feeding off," that is to say, gradually lowering the rotating drill pipe during the drilling operation, my invention makes possible the use of only one of the brake bands with the result that a better control of the feeding off operation is obtained.

It is an object of the invention to provide a system for operating the dual brakes of a cable drum having a pair of air operated cylinders, referred to herein as fluid motors, a source of fluid pressure including a control valve, and a three-way valve means operative to connect the control valve selectively to either or the fluid motors or to both of them when maximum braking ability is required.

It is a further object of the invention to provide a brake operating system of the character described in the foregoing having auxiliary means operative during the time one brake band is in use to also operate the remaining band so that the braking effect of both of the brake bands is then obtained.

It is a further object of the invention to provide a brake system having means operative when the normally employed control valve is adjusted to a predetermined opening to effect operation of both of the brake bands.

Further objects and advantages of the invention may be brought out in the following part of the specification wherein detail of a preferred form of the invention have been described so as to enable those skilled in the art to readily practice the invention, it being intended that the description of details shall not have the effect of limiting the scope of the invention defined in the accompanying claims.

The single view contained in the drawing schematically indicates a drawworks drum with brakes and includes a schematic representation of a preferred embodiment of my new brake operating system. The cable drum or spool S has brake drums D1 and D2 at the ends thereof around which brake bands 3 and 4 respectively are arranged. Levers L1 and L2 are shown for actuating the brakes by constricting the bands 3 and 4 around the drums D1 and D2 in the manner well known to the art.

The system has a pair of fluid operated motors for respectively constricting the brake bands 3 and 4, such fluid operated motors being shown as brake actuating cylinders A and B which are fed with air under pressure from a line 5 through relay valves 6 and 7. Air lines 8 and 9 are extended to the relay valves 6 and 7 for the operation thereof. If air pressure is delivered simultaneously through the lines 8 and 9, both the relay valves will be actuated to the same extent, depending upon the pressure in the lines 8 and 9, to feed controlled air pressure from the line 5 into both of the cylinders A and B to move the pistons P1 and P2 thereof forwardly with a force determined by the air pressure in the cylinders, the movement of the pistons P1 and P2 being transmitted through connecting rods C1 and C2 to the levers L1 and L2, with the result that the brake bands 3 and 4 will be constricted with the same force and thereby simultaneously actuate both of the brakes.

For control of the brake operation, two variable pressure control valves are arranged in parallel. One of these valves, namely, the main or service control valve 12 is connected to piping 13 which extends from a high pressure air reservoir 11, which, as shown, is also connected to the pipe 5. The outlet of the control valve 12 is connected through a pipe 14 with one of the side ports of a two-way check valve 15, the central port of which is connected through a pipe 10 with a three-way valve V. A foot operated valve 16, which is also of graduated type, has its inlet connected to the air supply pipe 13 through piping 13'. The outlet of the valve 16 is connected by piping 17 with the remaining side port of the two-way check valve 15, thereby providing an additional means whereby air under control pressure may be fed through the piping 10 to the valve V which is connected by pipes 18 and 19 and two-way check valves 22 and 23 respectively with the pipes 8 and 9 which are carried to the relay valves 6 and 7.

An auxiliary valve is associated with one of the control valves so that in case of an emergency the operation of both brakes will be assured. For this purpose an auxiliary control valve 24 has its inlet connected through piping 25 with a source of air pressure, shown in the present instance as the pipe 10. The outlet of the valve 24 is connected through pipes 26 and 27 and the two-way check valves 22 and 23 with the pipes 8 and 9. The auxiliary valve 24 is disposed in such position that its operating member, shown as a knob 28 will be engaged by the pedal 29 of the valve 16 when such pedal 29 is depressed to a predetermined point, or in other words to a point which will effect a predetermined opening of the valve 16.

Herein, the relay valves 6 and 7 are regarded as part of the fluid operating motors which include the cylinders A and B, for the reason that if desired, the parts of the system could be so designed as to make possible the connection of the pipes 8 and 9 directly to the cylinders A and B. The three-way valve V is of simple form and includes a plug 30 or equivalent valve structure whereby the valve, in one of its positions, will connect the pipe 10 through both of the pipes 18 and 19 with the pipes 8 and 9. By rotating the control of the valve V in either of two opposite directions, it may be adjusted so as to connect the pipe 10 either with the pipe 18 or the pipe 19 so that only one or the other of the brake bands 3 and 4 can be actuated.

During heavy hoisting operations, the valve V will be adjusted as shown in the drawing. At this time the controlled air pressure from either of the control valves 12 or 16 will be delivered through the pipes 18 and 19, the check valve 22 and 23 and the pipes 8 and 9 to the relay valves 6 and 7 which will permit flows of air from the supply duct 5 to the cylinders A and B under equal pressures, thereby actuating the brake bands 3 and 4 to the same extent. When the control pressure is released from the front ends of the cylinders A and B the pistons P1 and P2 will be returned to their initial positions, and the brake bands 3 and 4 will be released, by air under low pressure from a reservoir 32 which is connected through pipes 33 and 34 with the rear ends of the cylinders A and B. The pressure maintained in the reservoir 32 is small, for example, 10 p.s.i. as compared with the pressure of 125 per square inch, or greater, maintained in the main reservoir 11.

During light hoisting operations or feed off during drilling operations, the valve V is actuated so that the pipe 10 is connected to only one of the pipes 18 or 19. Then the controlling pressure from either of the control valves 12 or 16 will be carried to only one of the relay valves 6 or 7. However, both of the brakes may be actuated without the necessity of readjusting the valve V by actuation of the auxiliary valve 24 so that air will be supplied to both of the two way check valves. For example, let it be supposed that the valve V is adjusted so that pipe 10 is connected through pipe 18, check valve 22 and pipe 8 with the relay valve 6, for actuation of the left hand brake band 3. At this time, then, there will be no air pressure in the pipe 9, and if the auxiliary valve 24 is actuated air will be delivered therefrom through the pipes 26 and 27, the two-way check valve 23 and the pipe 9 to the relay valve 7, to effect delivery of air under pressure to the cylinder B so as to actuate the righthand brake band 4. If the foot operated control valve 16 is being used, the actuation of the auxiliary valve 24 is accomplished by swinging the pedal 29 down so as to engage the operating part 28 of the valve 24. The emergency conditions taken care of by the auxiliary valve 24 are several. Should there be a breakage in either of the pipes 18 and 19, flow of air through the pipes 26 and 27 and the two-way check valves to the pipes 8 and 9 may be accomplished, thereby actuating both of the brakes. If during the time the valve V is adjusted so as to operate only one of the brakes, trouble should arise in that part of the system beyond the valve V through which the selected brake is operated, actuation of the auxiliary valve 24 will effect delivery of air pressure to the relay valve associated with the dormant cylinder B.

I claim:

1. In a brake system: a rotatable member; a plurality of brakes connected to said rotatable member; first fluid motor means connected to a part of said plurality of brakes operable to actuate the same; other fluid motor means connected to the remainder of said brakes operable to actuate the same; a fluid pressure supply means including a control valve; valve means operable to connect said control valve to both of said motor means simultaneously, or to either of said motor means separately; and auxiliary fluid pressure control means connected to said motor means independently of said valve means and operating in response to the adjustment of said control valve to a predetermined opening to supply fluid pressure to both of said motor means.

2. In a brake system: a rotatable member; a plurality of brakes connected to said rotatable member; first fluid motor means connected to a part of said plurality of brakes operable to actuate the same; other fluid motor means connected to the remainder of said brakes operable to actuate the same; a fluid pressure supply means including a control valve; valve means operable to connect said control valve to both of said motor means simultaneously, or to either of said motor means separately; and auxiliary fluid pressure control means operating independently of said valve means when said fluid pressure is being supplied to only one of said motor means and operating in response to the adjustment of said control valve to a predetermined opening to also supply fluid pressure to the other of said motor means whereby all of the brakes will then be actuated simultaneously.

3. In a system for operating either or both of the drum brakes of a well drilling drawworks: a first fluid operated motor connected to one of said brakes for the operation thereof; a second fluid operated motor connected to the other of said brakes for the operation thereof; a fluid pressure supply means including a control valve; a three-way valve having its inlet port connected to the outlet of said control valve and having its first and second outlet ports connected through first and second ducts respectively to said first and second motors, said three-way valve being selectively operable so that fluid pressure from said control valve may be directed to either or both of said motors to simultaneously or individually actuate said brakes; a pair of double-check valves connected respectively to said ducts; and auxiliary fluid control means having a valve operating in response to the adjustment of said control valve to a predetermined opening to deliver fluid pressure to both of said double-check valves to accomplish simultaneous actuation of both of said fluid motors regardless of the condition of said three-way valve.

4. In a system for operating either or both of the drum brakes of a well drilling drawworks: a first fluid operated motor connected to one of said brakes for the operation thereof; a second fluid operated motor connected to the other of said brakes for the operation thereof; a fluid pressure supply means including a hand operated control valve and a foot operated control valve; a three-way valve having its inlet port connected through a double-check valve with the outlets of said control valves and having its first and second outlet ports connected through first and second ducts respectively to said first and second motors, said three-way valve being selectively operable so that fluid pressure from said control valves may be directed to either or both of said motors to simultaneously or individually actuate said brakes; a pair of double-check valves connected respectively to said ducts; and auxiliary fluid control means having a valve operating in response to the adjustment of one of said control valves to a predetermined opening to deliver fluid pressure to both of said double check valves to accomplish simultaneous action of both of said fluid motors regardless of the condition of said three-way valve.

References Cited in the file of this patent

UNITED STATES PATENTS

| | | |
|---|---|---|
| 2,007,500 | McCauley | July 9, 1935 |
| 2,317,753 | Garelli | Apr. 27, 1943 |
| 2,466,837 | Bohr | Apr. 12, 1949 |
| 2,489,449 | Crookston | Nov. 29, 1949 |
| 2,544,997 | Keim et al. | Mar. 13, 1951 |
| 2,666,295 | Stevens | Jan. 19, 1954 |